US006434289B1

(12) United States Patent
Paniccia et al.

(10) Patent No.: US 6,434,289 B1
(45) Date of Patent: *Aug. 13, 2002

(54) METHOD AND APPARATUS FOR CONFINING AN OPTICAL BEAM IN AN OPTICAL SWITCH

(75) Inventors: Mario J. Paniccia; Yi Ding; Dmitri E. Nikonov, all of Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 09/676,294

(22) Filed: Sep. 28, 2000

(51) Int. Cl.[7] .................................................. G02B 6/26
(52) U.S. Cl. .............................. 385/16; 385/14; 385/131
(58) Field of Search ............................. 385/16–24, 131, 385/14, 130, 8, 2, 40

(56) References Cited

U.S. PATENT DOCUMENTS

| 4,923,264 | A | * | 5/1990 | Langer et al. ................. 385/14 |
| 5,274,246 | A | | 12/1993 | Hopkins et al. |
| 6,215,585 | B1 | | 4/2001 | Yoshimura et al. |
| 6,233,378 | B1 | | 5/2001 | Sun |
| 6,236,774 | B1 | | 5/2001 | Lackritz et al. |
| 6,246,815 | B1 | | 6/2001 | Fujiwara et al. |
| 6,285,043 | B1 | | 9/2001 | Yap |
| 6,304,690 | B1 | | 10/2001 | Day |
| 6,310,700 | B1 | | 10/2001 | Betts |
| 6,310,999 | B1 | | 10/2001 | Marcuse et al. |
| 6,324,328 | B1 | | 11/2001 | Mehlhorn et al. |
| 6,330,376 | B1 | | 12/2001 | Paniccia |
| 6,343,171 | B1 | | 1/2002 | Yoshimura et al. |

OTHER PUBLICATIONS

E.D. Novak, L. Ding, Y.T. Loh, and C. Hu, "Speed, Power, and Yield Comparison of Thin Bonded SOI versus Bulk SMOS Technologies", in *Proceedings 1994 IEEE International SOI Conference*, Oct. 1994, VLSI Technology, Inc., San Jose, CA, pp. 41–42.

* cited by examiner

*Primary Examiner*—Phan T. H. Palmer
(74) *Attorney, Agent, or Firm*—Blakely, Sokoloff, Taylor & Zafman LLP

(57) ABSTRACT

A device for confining an optical beam in an optical switch. In one embodiment, the disclosed optical switch includes an optical switching device disposed between an optical input port and an optical output port in a semiconductor substrate layer disposed between a plurality of optical confinement layers such that an optical beam is confined to remain within the layers. In one embodiment, a plurality of semiconductor substrate layers are included in the optical switch. Each of the semiconductor substrate layers is disposed between optical confinement layers such that optical beams passing through the semiconductor substrate layers are confined to remain within the semiconductor substrate layers until exiting through respective optical output ports. In one embodiment, integrated circuitry such as driver circuitry, controller circuitry, logic circuitry, coder-decoder circuitry, microprocessor circuitry or the like is included in at least one of the semiconductor substrate layers.

24 Claims, 7 Drawing Sheets

US 6,434,289 B1

METHOD AND APPARATUS FOR CONFINING AN OPTICAL BEAM IN AN OPTICAL SWITCH

RELATED APPLICATIONS

This application is related to co-pending application Ser. No. 09/470,574, filed Dec. 22, 1999, entitled "Method and Apparatus For Switching an Optical Beam," and assigned to the Assignee of the present application.

This application is also related to co-pending application Ser. No. 09/676,293, filed Sep. 28, 2000, entitled "Method and Apparatus For Switching A Plurality of Optical Beams In An Optical Switch," and assigned to the Assignee of the present application.

This application is also related to co-pending application Ser. No. 09/676,297, filed Sep. 28, 2000, entitled "Method and Apparatus For Switching An Optical Beam In An Integrated circuit Die," and assigned to the Assignee of the present application.

BACKGROUND OF THE INVENTION

1. Field of the Invention

The present invention relates generally to the switching signals and, more specifically, the present invention relates to switching or routing optical signals.

2. Background Information

The need for fast and efficient optical switches is increasing as Internet data traffic growth rate is overtaking voice traffic pushing the need for optical communications. Two commonly found types of optical switches are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally rely upon the actual mechanical movement of physical parts or components, MEMS are generally limited to slower speed optical applications, such as for example applications having response times on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate ($LiNbO_3$).

Lithium niobate is a transparent, material that exhibits electro-optic properties such as the Pockels effect. The Pockels effect is the optical phenomenon in which the refractive index of a medium, such as lithium niobate, varies with an applied electric field. The varied refractive index of the lithium niobate may be used to provide switching. The applied electrical field is provided to present day electro-optical switches by external control circuitry.

Although the switching speeds of these types of devices are very-fast, for example on the order of nanoseconds, one disadvantage with present day electro-optic switching devices is that these devices generally require relatively high voltages in order to switch optical beams. Consequently, the external circuits utilized to control present day electro-optical switches are usually specially fabricated to generate the high voltages and suffer from large amounts of power consumption. In addition, integration of these external high voltage control circuits with present day electro-optical switches is becoming an increasingly challenging task as device dimensions continue to scale down and circuit densities continue to increase.

BRIEF DESCRIPTION OF THE DRAWINGS

The present invention is illustrated by way of example and not limitation in the accompanying figures.

DETAILED DESCRIPTION

Figure 1:
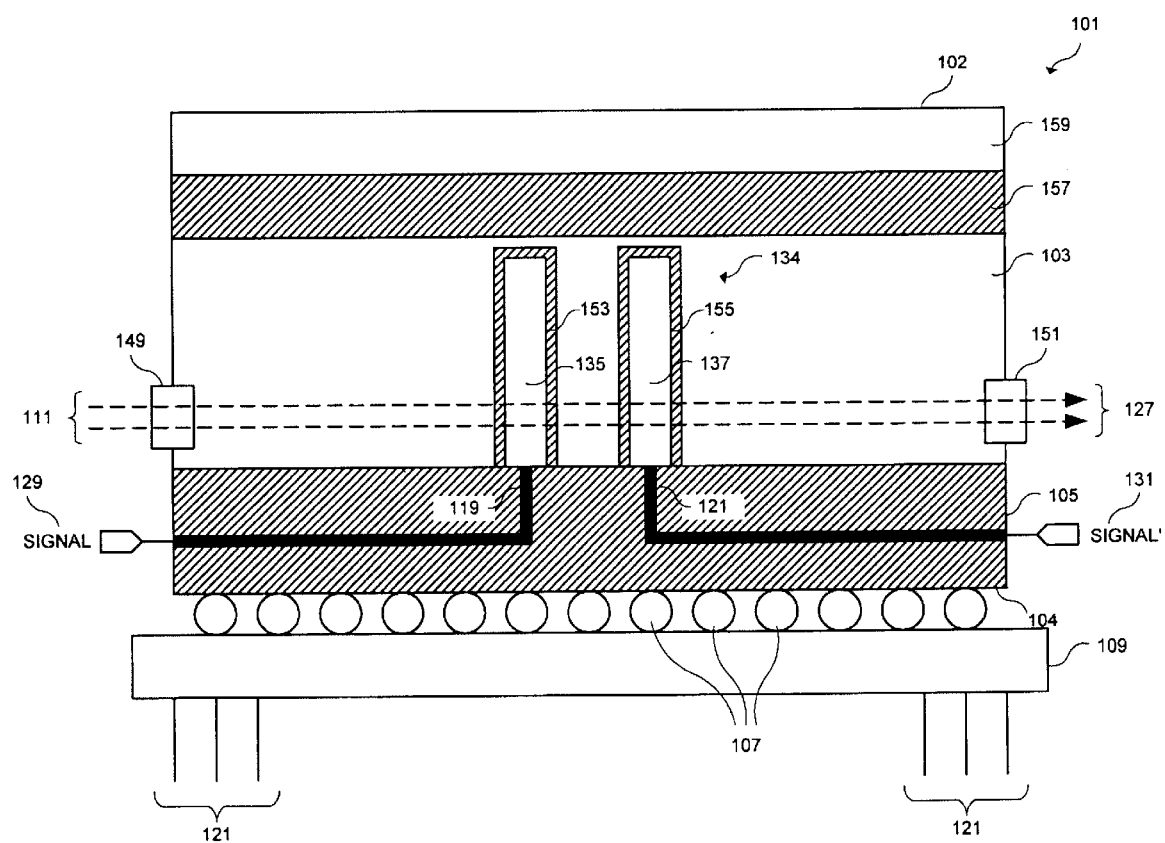
FIG. 1 is a side view illustration of one embodiment of an optical switch including optical confinement layers in accordance with the teachings of the present invention.

Methods and apparatuses for confining an optical beam in an optical switch are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

In one embodiment of the present invention, a semiconductor-based optical switch or router is provided in a fully integrated solution on a single integrated circuit chip. One embodiment of the presently described optical switch includes optical confinement layers and/or regions and can be used in a variety of high bandwidth applications including multi-processor, telecommunications, networking or the like. In one embodiment, the presently described optical modulator includes an array of trench capacitors disposed in a silicon semiconductor substrate layer. In one embodiment, the optical confinement layers and/or regions are employed to help confine an optical beam to pass through the array of trench capacitors. The array of trench capacitors may also be referred to as a phase array in accordance with the teachings of the present invention. Charge in the array is modulated by the trench capacitors to switch an optical beam directed through the array in response to a signal. In one embodiment, the control circuitry used to generate the signal is integrated in the same die as the array. Thus, in one embodiment the array and the control circuitry are fully integrated on the same integrated circuit chip. In one embodiment, the optical beam is switched by the array selectively attenuating the optical beam. In another embodiment, the optical beam is switched by selectively modulating the phase of at least a portion of the optical beam.

In one embodiment, a one-dimensional array is formed with the trench capacitors in the semiconductor substrate layer. In another embodiment, a two-dimensional array is formed with the trench capacitors in the semiconductor substrate layer. In one embodiment, a phase array including uncharged and selectively modulated charged regions is provided by the array trench capacitors. In one embodiment, the interference intensity pattern caused by the phase array is modulated in response to a signal. For instance, by selectively biasing individual trench capacitors in one embodiment of the phase array, the charge distribution across the phase array can be controlled by the signal in one embodiment of the present invention.

As a result, the amount of phase modulation of different portions of the optical beam passing through different portions the phase array is controlled by the signal in one embodiment. A resulting interference occurs between the phase modulated portions and non-phase modulated portions of the optical beam. The interference among the different portions of the optical beam results in an interference intensity pattern of the phase array, which may be controlled by the signal in one embodiment of the present invention. By adjusting the interference intensity pattern of the phase array, an incident optical beam is selectively directed to one of a plurality of output ports in accordance with the teachings of the present invention.

FIG. 1 is a side view illustration of one embodiment of an optical switch 101 including optical confinement layers in accordance with the teachings of the present invention. In one embodiment, optical switch 101 is a controlled collapse chip connection (C4) or flip chip packaged integrated circuit die coupled to package substrate 109 through ball bonds 107. As can be appreciated by those skilled in the art, ball bonds 107 provide more direct connections between the internal integrated circuit nodes of optical switch 101 and the pins 121 of package substrate 109, thereby reducing inductance problems associated with typical wire bond integrated circuit packaging technologies. In one embodiment, the internal integrated circuit nodes of optical switch 101 are located towards the front side 104 of optical switch 101. Another characteristic of flip chip packaging is that full access to a back side. 102 of optical switch 101 is provided. It is appreciated that in another embodiment, optical switch 101 is not limited to being mounted in a flip chip packaged configuration. In other embodiments, packaging technologies other than flip chip packaging may be employed in accordance with the teachings of the present invention such as for example but not limited to wire bond packaging or the like.

In one embodiment, the optical switch 101 of the present invention includes an optical switching device 134 including an array of trench capacitors including trench capacitor 135 and trench capacitor 137, as illustrated in FIG. 1. In one embodiment, trench capacitors 135 and 137 include polysilicon disposed in a semiconductor substrate layer 103 of optical switch 101. In one embodiment, semiconductor substrate layer 103 includes silicon. As illustrated in FIG. 1, one embodiment of optical switch 101 includes an insulating region 153 disposed between the polysilicon of trench capacitor 135 and the semiconductor substrate layer 103. Similarly, an insulating region 155 is disposed between the polysilicon of trench capacitor 137 and the semiconductor substrate layer 103.

In one embodiment, a signal 129 and a signal' 131 are coupled to be received by trench capacitors 135 and 137, respectively, of optical switching device 134. In one. embodiment, signal 129 and signal' 131 are generated by control circuitry on the integrated circuit die of optical switch 101. In one embodiment, the control circuit generating signal 129 and signal' 131 is disposed in semiconductor substrate layer 103 outside of the optical path between optical input port 149 and optical port 151. In another embodiment, signal 129 and signal' 131 are generated by control circuitry external to the integrated circuit die of optical switch 101. In one embodiment, signal 129 and signal' 131 are coupled to be received by trench capacitors 135 through conductors 119 and 121, which are disposed in an optical confinement layer 105 of optical switch 101. In one embodiment, optical confinement layer 105 is an insulating layer and includes a dielectric layer of optical switch 101.

In one embodiment, signal 129 and signal' 131 are a plurality of signals separately coupled to be received by the trench capacitors 135 and 137 in optical switching device 134. For example, in one embodiment, signal 129 and signal' 131 are the same signals having opposite polarities. In another embodiment, signal 129 and signal' 131 are the same signals having the same polarities. In yet another embodiment, signal 129 and signal' 131 are separate signals coupled to capacitors across the array to control or modulate a charge distribution of free charge carriers across the array of trench capacitors 135 and 137.

As illustrated in FIG. 1, one embodiment of optical switch 101 includes an optical input port 149 and an optical output port 151 disposed in or optically coupled to semiconductor substrate layer 103 on different sides of the array of trench capacitors 135 and 137 of optical switching device 134. In one embodiment, an optical beam 111 is directed optical input port 149 and through semiconductor substrate layer 103 to the array of trench capacitors 135 and 137 of optical switching device 134. In one embodiment, optical beam 111 is directed into optical input port 149 through an optical fiber or the like. As mentioned, in one embodiment, semiconductor substrate layer 103 includes silicon, trench capacitors 135 and 137 include polysilicon and optical beam 111 includes infrared or near infrared laser light. As known to those skilled in the art, silicon is partially transparent to infrared or near infrared light. For instance, in one embodiment in which optical switch 101 is utilized in telecommunications, optical beam 111 has an infrared wavelength of approximately 1.55 or 1.3 micrometers.

As will be discussed, optical beam 111 is switched by the array of trench capacitors 135 and 137 of optical switching device 134. A switched optical beam 127 is then directed from the array of trench capacitors 135 and 137 through semiconductor substrate layer 103 to optical output port 151. In one embodiment, switched optical beam 127 is directed from optical output port 151 through an optical fiber or the like. It is appreciated that in other embodiments (not shown), optical beam 111 and switched optical beam 127 may enter and/or exit semiconductor substrate layer 103 through back side 102 and/or front side 104 in accordance with the teachings of the present invention.

In one embodiment, optical switch 101 includes an optical confinement layer 157 disposed proximate to semiconductor substrate layer 103. Thus, semiconductor substrate layer 103 is disposed between optical confinement layer 157 and optical confinement layer 105. In one embodiment, optical confinement layer 157 is an insulating layer. In particular, optical energy or light from optical beam 111 or switched optical beam 127 is reflected from the interfaces between semiconductor substrate layer 103 and optical confinement layer 157 or optical confinement layer 105. For example, light from optical beam 111 will have an angle of incidence θ relative to the interface between semiconductor substrate layer 103 and optical confinement layer 157 or optical confinement layer 105. For purposes of this disclosure, an incident angle θ is the angle that an optical beam makes with an imaginary line perpendicular to a surface at the point of incidence. In the embodiment depicted in FIG. 1, optical beam 111 or switched optical beam 127 is deflected off the interface between semiconductor substrate layer 103 and optical confinement layer 157 or optical confinement layer 105 because of total internal reflection.

In one embodiment, optical confinement layer 157 and optical confinement layer 105 include silicon oxide or the like and have an index of refraction of approximately $n_{oxide}=1.5$ and semiconductor substrate layer 103 includes silicon and has an index of refraction of approximately $n_{si}=3.5$. In order to have total internal reflection of optical beam 111 or switched optical beam 127, the incident angle θ of optical beam 111 or switched optical beam 127 relative to the interface between semiconductor substrate layer 103 and optical confinement layer 157 or optical confinement layer 105 satisfies the following relationship:

$$\sin \theta > n_{oxide}/n_{Si} \qquad \text{(Equation 1)}$$

As a result of the total internal reflection, optical beam 111 is in one embodiment is confined to remain with semiconductor substrate layer 103 using optical confinement layer 157 and optical confinement layer 105 until switched optical beam 127 exits through optical output port 151.

In one embodiment, optical switch 101 is constructed from a silicon-on-insulator (SOI) wafer. For instance, during manufacture, a known SOI wafer is provided including a semiconductor substrate layer 159, optical confinement layer 157 and semiconductor substrate layer 103. Trench capacitors 135 and 137 of optical switching device 134 are then formed in semiconductor substrate layer 103. In one embodiment, trench capacitors are fabricated to be approximately 1–2 μm deep. It is appreciated of course that in other embodiments, trench capacitors 135 and 137 may have different depths in accordance with the teachings of the present invention. Next, optical confinement layer 105 is formed with conductors 119 and 131 providing accesses to trench capacitors 135 and 137. Afterwards, ball bonds 107 and package substrate 109 are added.

Figure 2:
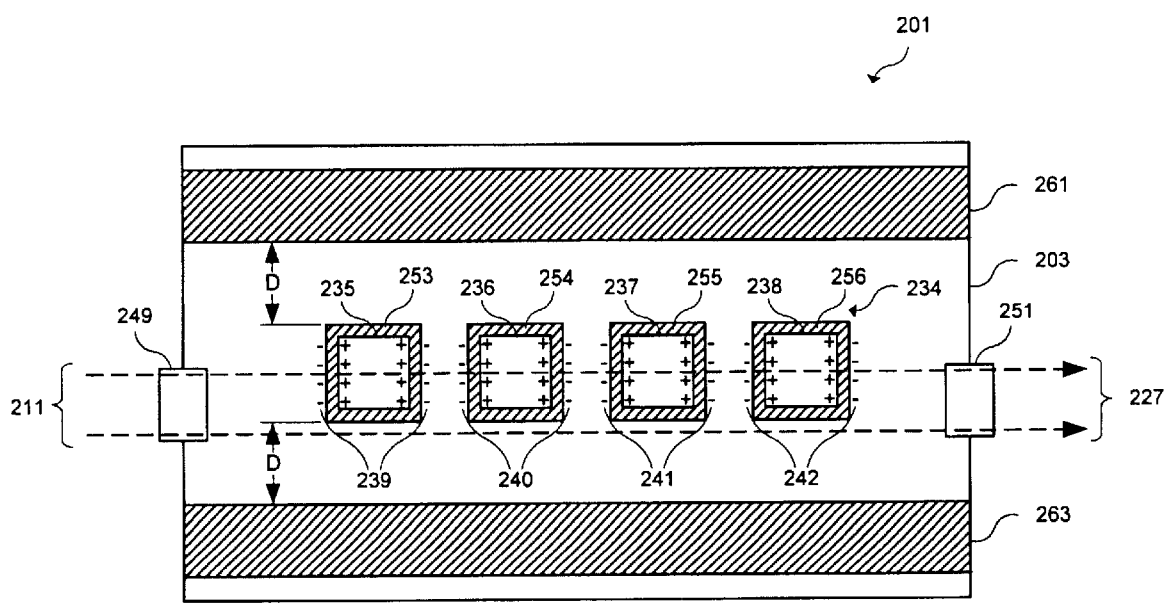
FIG. 2 is a top view illustration of one embodiment of optical confinement regions included in an optical switch that is biased to modulate a phase of a portion of an optical beam in accordance with the teachings of the present invention.

FIG. 2 is a top view illustration of one embodiment of optical confinement regions 261 and 263 included in an optical switch 201 that is biased such that an optical beam 211 is switched in accordance with the teachings of the present invention. As illustrated, an array of trench capacitors 235, 236, 237 and 238 are disposed in a semiconductor substrate layer 203. Insulating regions 253, 254, 255 and 256 are disposed between the semiconductor substrate layer 203 and polysilicon of trench capacitors 235, 236, 237 and 238, respectively. An optical path is disposed between optical input port 249 and optical output port 251. In one embodiment, optical fibers or the like are optically coupled to optical input port 249 and optical output port 251.

In one embodiment, optical confinement regions 261 and 263 are disposed along the sides of optical path between optical input port 249 and optical output port 251. As shown in the embodiment depicted in FIG. 2, optical confinement regions 261 and 263 are disposed a distance D away from insulating regions 253, 254, 255 and 256. In one embodiment, D is a distance greater than or equal to zero. Accordingly, in another embodiment in which D is equal to zero, optical confinement regions 261 and 263 are adjacent to insulating regions 253, 254, 255 and 256. In one embodiment, the optical confinement regions 261 and 263 include insulative material such as for example oxide and semiconductor substrate layer 203 includes for example silicon. As a result, optical beam 211 and switched optical beam 227 are confined to remain within the semiconductor substrate layer 203 until exiting through optical output port 251. In one embodiment, optical confinement layers, similar to for example optical confinement layer 157 and optical confinement layer 105 of FIG. 1, are also disposed along the "top" and "bottom" of the optical path is disposed between optical input port 249 and optical output port 251. These optical confinement layers are not shown in FIG. 2 for clarity.

In the depicted embodiment, trench capacitors 235, 236, 237 and 238 are biased in response to signal voltages such that the concentration of free charge carriers in charged regions 239, 240, 241 and 242 of the array of trench capacitors is modulated. In one embodiment in which D is greater than zero, an optical beam 211 is directed through semiconductor substrate layer 203 such that a portion of optical beam 211 is directed to pass through the modulated charge regions 239, 240, 241 and 242 and a portion of optical beam 211 is not directed to pass through the modulated charge regions 239, 240, 241 and 242. As a result of the modulated charge concentration in charged regions 239, 240, 241 and 242, optical beam 211 is switched resulting in switched optical beam 227 being directed from the array of trench capacitors through semiconductor substrate layer 203.

In one embodiment, semiconductor substrate layer 203 is doped to include free charge carriers. In one embodiment, semiconductor substrate layer 203 is n type doped silicon and the free charge carriers are electrons. In another embodiment, semiconductor substrate layer 203 is p type doped silicon and the free charge carriers are holes. In one embodiment, the polysilicon of trench capacitors 235, 236, 237 and 238 is n type doped polysilicon and the free charge carriers are electrons. In another embodiment, the polysilicon of trench capacitors 235, 236, 237 and 238 are p type doped polysilicon and the free charge carriers are holes.

In one embodiment, the free charge carriers attenuate optical beam 211 when passing through semiconductor substrate layer 203. In particular, the free charge carriers attenuate optical beam 211 by converting some of the energy of optical beam 211 into free charge carrier energy.

In another embodiment, the phase of the portion of optical beam 211 that passes through the charged regions 239, 240, 241 and 242 is modulated in response to the signal. In one embodiment, the phase of optical beam 211 passing through free charge carriers in charged regions 239, 240, 241 and 242 is modulated due to the plasma optical effect. The plasma optical effect arises due to an interaction between the optical electric field vector and free charge carriers that may be present along the propagation path of the optical beam 211. The electric field of the optical beam 211 polarizes the free charge carriers and this effectively perturbs the local dielectric constant of the medium. This in turn leads to a perturbation of the propagation velocity of the optical wave and hence the refractive index for the light, since the refractive index is simply the ratio of the speed of the light in vacuum to that in the medium. The free charge carriers are accelerated by the field and also lead to absorption of the optical field as optical energy is used up. Generally the refractive index perturbation is a complex number with the real part being that part which causes the velocity change and the imaginary part being related to the free charge carrier absorption. The amount of phase shift $\phi$ is given by $$\phi = (2\pi/\lambda)\Delta n L \quad \text{(Equation 2)}$$

with the optical wavelength $\lambda$ and the interaction length L. In the case of the plasma optical effect in silicon, the refractive index change $\Delta n$ due to the electron ($\Delta N_e$) and hole ($\Delta N_h$) concentration change is given by:

$$\Delta n = -\frac{e^2 \lambda^2}{8\pi^2 c^2 \varepsilon_0 n_0}\left(\frac{b_e(\Delta N_e)^{1.05}}{m_e^*} + \frac{b_h(\Delta N_h)^{0.8}}{m_h^*}\right) \quad \text{(Equation 3)}$$

where $n_o$ is the nominal index of refraction for silicon, e is the electronic charge, c is the speed of light, $\varepsilon_0$ is the permittivity of free space, $m_e^*$ and $m_h^*$ are the electron and hole effective masses, respectively, $b_e$ and $b_h$ are fitting parameters.

In one embodiment, the amount of phase shift $\phi$ of some portions of optical beam 211 passing through the free charge carriers of charged regions 239, 240, 241 and 242 is approximately $\pi/2$. In one embodiment, the phase of a portion of optical beam 211 not passing though the free charge carriers of charged regions 239, 240, 241 and 242, i.e. passing through uncharged regions, is relatively unchanged. In one embodiment, a resulting interference occurs between the phase modulated portions and non-phase modulated portions of optical beam 211 passing through the array of trench capacitors 235, 236, 237 and 238. In one embodiment in which D is equal to zero, there is no portion of optical beam 211 not passing though the free charge carriers of charged regions 239, 240, 241 and 242 as optical confinement regions 261 and 263 confine optical beam 211 to pass through charged regions 239, 240, 241 and 242.

It is noted that optical switch 201 has been illustrated in FIG. 2 with four trench capacitors 235, 236, 237 and 238. It is appreciated that in other embodiments, optical switch 201 may include a greater or fewer number of trench capacitors in accordance with the teachings of the present invention with the number of trench capacitors chosen to achieve the required phase shift. In particular, the interaction length L discussed in connection with Equation 2 above may be varied by increasing or decreasing the total number of trench capacitors 235, 236, 237 and 238 in optical switching device 134 of optical switch 201.

Figure 3:
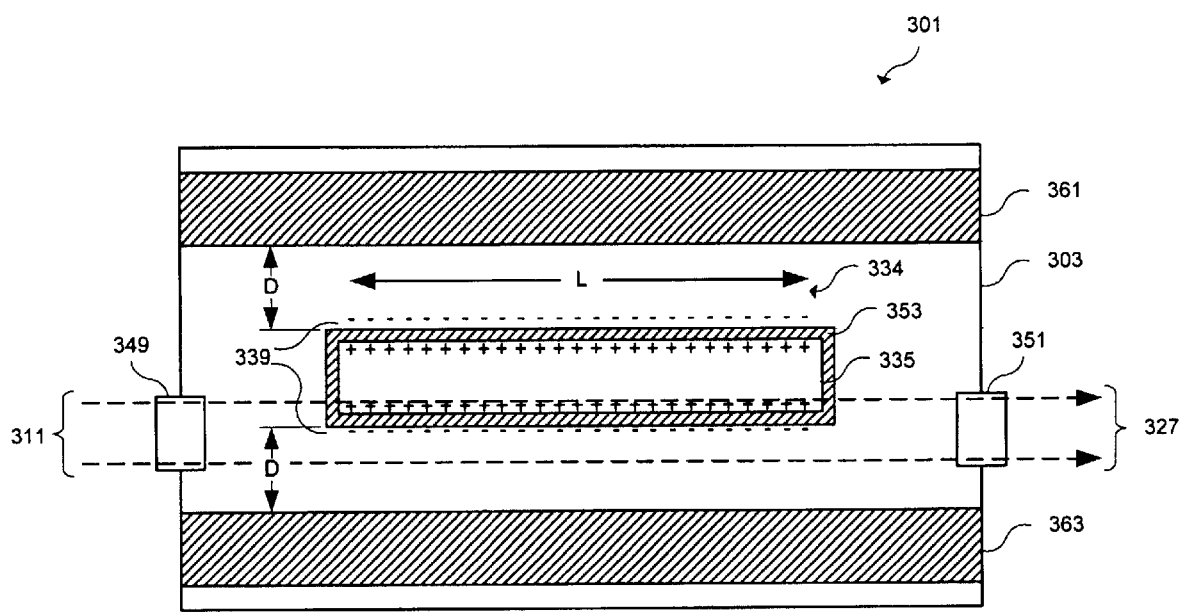
FIG. 3 is a top view illustration of another embodiment of optical confinement regions included in an optical switch that is biased to modulate a phase of a portion of an optical beam in accordance with the teachings of the present invention.

FIG. 3 is a top view illustration of one embodiment of optical confinement regions 361 and 363 included in an optical switch 301 that is biased such that an optical beam 311 is switched in accordance with the teachings of the present invention. As illustrated, one embodiment of optical switch 301 includes an optical switching device 334 having a trench capacitor 335 disposed in a semiconductor substrate layer 303. An insulating region 353 is disposed between the polysilicon of trench capacitor 335 and semiconductor substrate layer 303. In one embodiment, trench capacitor 335 is one of a plurality or array of trench capacitors disposed in semiconductor substrate layer 303. An optical path is disposed between optical input port 349 and optical output port 351. In one embodiment, optical fibers or the like are optically coupled to optical input port 349 and optical output port 351.

In one embodiment, optical confinement regions 361 and 363 are disposed along the sides of optical path between optical input port 349 and optical output port 351. As shown in the embodiment depicted in FIG. 3, optical confinement regions 361 and 363 are disposed a distance D away from insulating region 353. In one embodiment, D is a distance greater than or equal to zero. In one embodiment, the optical confinement regions 361 and 363 include insulative material such as for example oxide and semiconductor substrate layer 303 includes for example silicon. As a result, optical beam 311 and switched optical beam 327 are confined to remain within the semiconductor substrate layer 303 until exiting through optical output port 351. In one embodiment, optical confinement layers, similar to for example optical confinement layer 157 and optical confinement layer 105 of FIG. 1, are also disposed along the "top" and "bottom" of the optical path is disposed between optical input port 349 and optical output port 351. These optical confinement layers are not shown in FIG. 3 for clarity.

In the depicted embodiment, trench capacitor 335 is biased in response to a signal such that the concentration of free charge carriers in charged regions 339 is modulated. In one embodiment, an optical beam 311 is directed through semiconductor substrate layer 303 such that a portion of optical beam 311 is directed to pass through the modulated charge regions 339 and a portion of optical beam 311 is not directed to pass through the modulated charge region 339. As a result of the modulated charge concentration in charged region 339, optical beam 311 is switched resulting in switched optical beam 327 being directed from trench capacitor 335 through semiconductor substrate layer 303. In an embodiment in which D is equal to zero, there is no portion of optical beam 311 not passing through modulated charge region 339.

In one embodiment, the phase of the portion of optical beam 311 that passes through the charged regions 339 is modulated in response to the signal due to the plasma optical effect discussed above. As can be observed from Equation 2 above, one way to increase the phase shift $\phi$ in optical beam 311 is to increase the interaction length L of the charged region 339. In one embodiment, an increase interaction length L is provided by trench capacitor 335 by providing an increased dimension L, as illustrated in FIG. 3.

Figure 4:
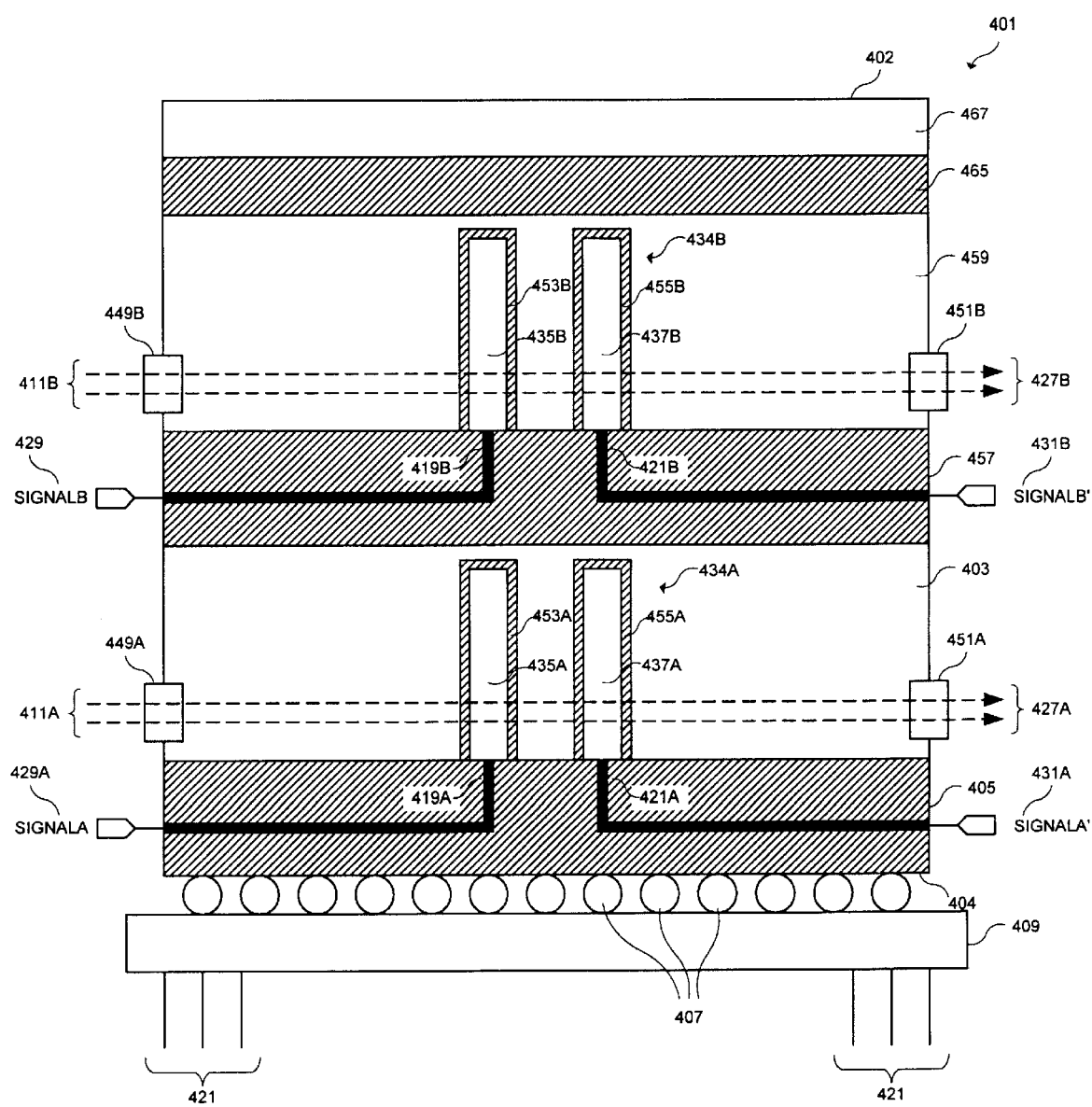
FIG. 4 is a side view illustration of another embodiment of an optical switch including optical confinement layers in accordance with the teachings of the present invention.

FIG. 4 is a side view illustration of another embodiment of an optical switch 401 including optical confinement layers in accordance with the teachings of the present invention. Optical switch 401 has some similarities to the optical switch 101 of FIG. 1 insofar as one embodiment of optical switch 401 includes an optical switching device 434A having a plurality of trench capacitors 435A and 437A disposed in a semiconductor substrate layer 403A between an optical input port 449A and an optical output port 451A. In one embodiment, optical fibers or the like are optically coupled to optical input port 449A and optical output port 451A.

In one embodiment, insulating regions 453A and 455A are disposed between semiconductor substrate layer 403 and the polysilicon of trench capacitors 435A and 437A, respectively. In one embodiment, a signalA 429A is coupled to be received by trench capacitor 435A through conductor 419A and a signalA' 431A is coupled to be received by trench capacitor 437A through conductor 421A. In one embodiment, conductors 419A and 421A are disposed in an optical confinement layer 405 of optical switch 401. In one embodiment, semiconductor substrate layer 403 is disposed between optical confinement layer 405 and an optical confinement layer 457. In one embodiment, optical switch 401 is packaged as a flip-chip packaged integrated circuit.

As illustrated in FIG. 4, optical switch 401 also includes another semiconductor substrate layer 459 disposed proximate to optical confinement layer 457 such that optical confinement layer 457 is disposed between semiconductor substrate layers 403 and 459. In one embodiment, optical switch 401 is also fabricated from a multi-layered SOI wafer including a semiconductor substrate layer 467, which is disposed proximate to an optical confinement layer 465, which is disposed proximate to semiconductor substrate layer 459, which is disposed proximate to optical confinement layer 457, which is disposed proximate to semiconductor substrate layer 403, which is disposed proximate to optical confinement layer 405. In one embodiment, all optical confinement layers 465, 457 and 405 include insulating layers.

In one embodiment, an optical switching device 434B having a plurality of trench capacitors 435B and 437B is disposed in a semiconductor substrate layer 459 between an optical input port 449B and an optical output port 451B. In one embodiment, optical fibers or the like are optically coupled to optical input port 449B and optical output port 451B. In one embodiment, insulating regions 453B and 455B are disposed between semiconductor substrate layer 459 and the polysilicon of trench capacitors 435B and 437B, respectively. In one embodiment, a signalB 429B is coupled to be received by trench capacitor 435B through conductor 419B and a signalB' 431B is coupled to be received by trench capacitor 437B through conductor 421B. In one embodiment, conductors 419B and 421B are disposed in optical confinement layer 457 of optical switch 401.

As shown in FIG. 4, one embodiment of optical switch 401 has a plurality of semiconductor substrate layers 403 and 459 having optical switching devices 434A and 434B, respectively. Optical input port 449A is selectively optically coupled to optical output port 451A and optical input port 449B is selectively optically coupled to optical output port 451B. In one embodiment, optical beam 411A is directed from optical input port 449A and is directed through semiconductor substrate layer 403 to optical switching device 434A. Switched optical beam 427A is then selectively directed to optical output port 451A in response to signalA 429A and signalA' 431A. Similarly, optical beam 411B is directed from optical input port 449B and is directed through semiconductor substrate layer 459 to optical switching device 434B. Switched optical beam 427B is then selectively directed to optical output port 451B in response to signalB 429B and signalB' 431B.

As shown in the embodiment depicted in FIG. 4, optical confinement layers 405 and 457 confine light from optical beam 411A and/or switched optical beam 427A to remain in semiconductor substrate layer 403 until exiting through optical output port 451A. Similarly, optical confinement layers 457 and 465 confine light from optical beam 411B and/or switched optical beam 427B to remain in semiconductor substrate layer 459 until exiting through optical output port 451A. Therefore, optical ports 449A and 451A are optically isolated from trench capacitors 435B and 437B. Similarly, optical ports 449B and 451B are optically isolated from trench capacitors 435A and 437A.

It is noted that optical switch 401 is shown in FIG. 4 as having two semiconductor substrate layers 403 and 459 separated by optical confinement layer 457 for explanation purposes. In other embodiments, it is appreciated that additional semiconductor substrate layers may be included in optical switch 401, some or all of which including optical switching devices, that are optically confined with optical confinement layers in accordance with the teachings of the present invention.

In one embodiment, during manufacture, a known SOI wafer is provided already including semiconductor substrate layer 467, optical confinement layer 465 and semiconductor substrate layer 459. Trench capacitors 435B and 437B are then formed in semiconductor substrate layer 459. Then, optical confinement layer 457 is formed with conductors 419B and 421B providing accesses to trench capacitors 435B and 437B. Next, semiconductor substrate layer 403 is formed proximate to optical confinement layer 457. Trench capacitors 435A and 437A are then formed in semiconductor substrate layer 403. Then, optical confinement layer 405 is formed with conductors 419A and 431A providing accesses to trench capacitors 435A and 437A. Afterwards, ball bonds 407 and package substrate 409 are added.

In another embodiment, during manufacture, another known SOI wafer is provided already including semiconductor substrate layer 467, optical confinement layer 465, semiconductor substrate layer 459, optical confinement layer 457 and semiconductor substrate layer 403. In one embodiment, the SOI wafer is then trenched through semiconductor substrate layer 403 to semiconductor substrate layer 459 and then trench capacitors 435B and 437B of optical switching device 434B are then formed in semiconductor substrate layer 459. Conductors 419B and 421B are formed to provide access to optical switching device 434B. In one embodiment, semiconductor substrate layer 403 is also trenched to form trench capacitors 435A and 437A of optical switching device 434A. Optical confinement layer 405 and conductors 419A and 421 A are then formed such that access is provided to trench capacitors 435A and 437A. Afterwards, ball bonds 407 and package substrate 409 are added.

Figure 5:
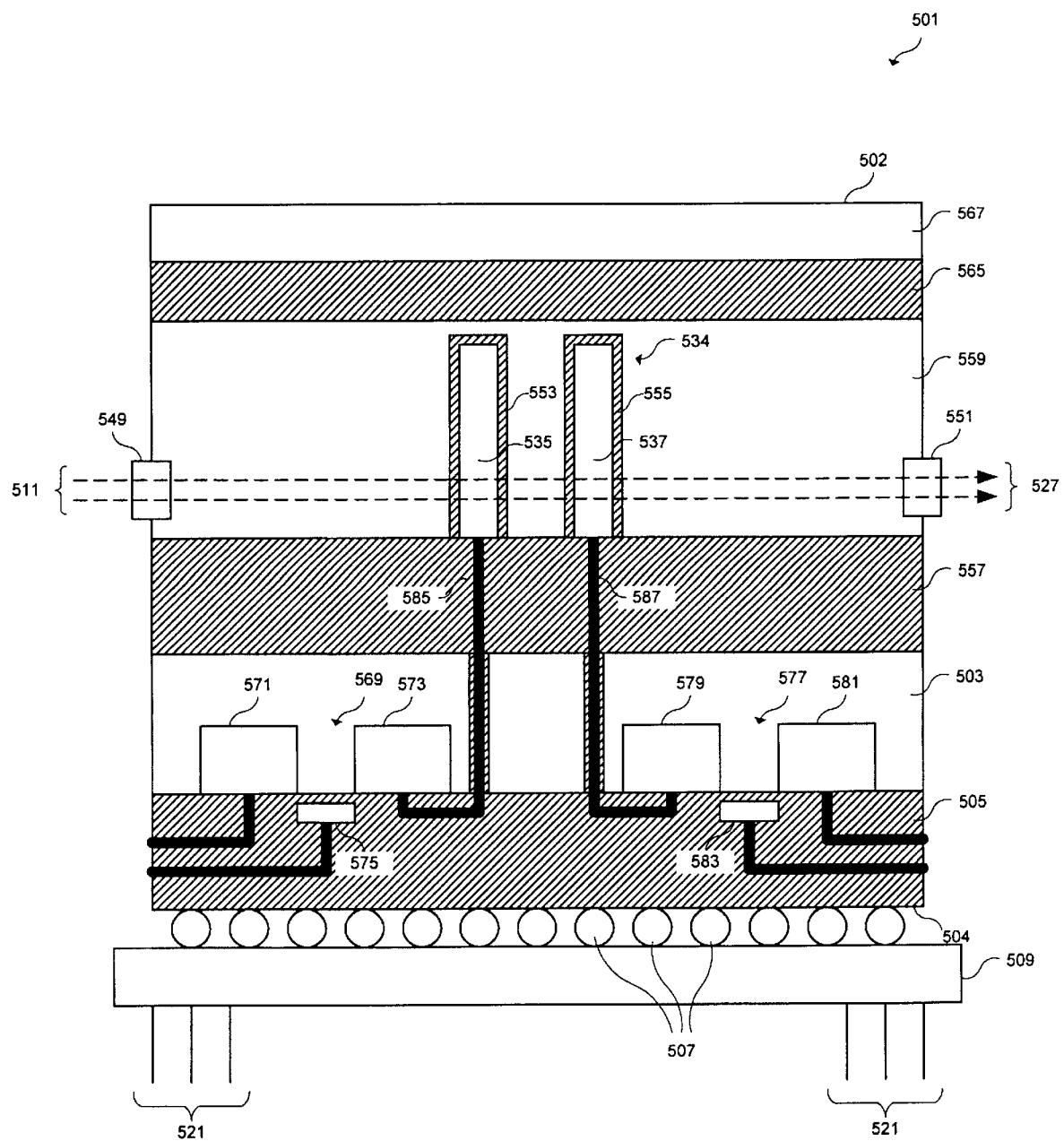
FIG. 5 is a side view illustration of one embodiment of an optical switch combined with integrated circuitry disposed in a semiconductor die having optical confinement layers in accordance wit the teachings of the present invention.

FIG. 5 is a side view illustration of another embodiment of an optical switch 501 including optical confinement layers and integrated circuitry in accordance with the teachings of the present invention. Optical switch 501 has some similarities to the optical switch 401 of FIG. 4 insofar as one embodiment of optical switch 501 is packaged as a flip-chip packaged integrated circuit and includes a plurality of semiconductor substrate layers 503 and 559. Semiconductor substrate layer 503 is disposed between optical confinement layers 505 and 557. Semiconductor substrate layer 559 is disposed between optical confinement layers 557 and 565.

In one embodiment, optical switch 501 includes an optical switching device 534, which in one embodiment includes plurality of trench capacitors 535 and 537 disposed in semiconductor substrate layer 559 between an optical input port 549 and an optical output port 551. In one embodiment, optical fibers or the like are optically coupled to optical input port 549 and optical output port 551. In one embodiment, insulating regions 553 and 555 are disposed between semiconductor substrate layer 559 and the polysilicon of trench capacitors 535 and 537, respectively. In one embodiment, a signal is coupled to be received by trench capacitor 535 through conductor 585 and a signal' is coupled to be received by trench capacitor 537 through conductor 587. In one embodiment, conductors 585 and 587 are routed through optical confinement layer 557 from integrated circuitry disposed in semiconductor substrate layer 503. Optical input port 549 is selectively optically coupled to optical output port 551. An optical beam 511 is directed from optical input port 549 and is directed through semiconductor substrate layer 559 to optical switching device 534. Switched optical beam 527 is then selectively directed to optical output port 551 in response to the signals carried in conductors 585 and 587.

In one embodiment, the integrated circuitry included in optical switch 501 is disposed in another semiconductor substrate layer. For instance, as illustrated in FIG. 5, transistors 569 and 577 of the integrated circuitry of optical switch 501 are disposed in semiconductor substrate layer 503. In one embodiment, semiconductor substrate layer 503 is disposed proximate to optical confinement layer 557 such that optical confinement layer 557 is disposed between semiconductor substrate layers 503 and 559. In one embodiment, transistor 569 includes doped regions 571 and 573 disposed in semiconductor substrate layer 503 and gate 575 disposed between doped regions 571 and 573 in optical confinement layer 505. Transistor 577 includes doped regions 579 and 581 disposed in semiconductor substrate layer 503 and gate 583 disposed between doped regions 579 and 581 in optical confinement layer 505.

In one embodiment, transistors 569 and 577 are included in driver circuitry used to drive trench capacitors 535 and 537. As shown in the embodiment of FIG. 5, doped region 573 is coupled to trench capacitor 535 through conductor 585 and doped region 579 is coupled to trench capacitor 537 through conductor 587. In one embodiment, the integrated circuitry disposed in semiconductor substrate layer 503 may include driver circuitry, controller circuitry, logic circuitry, coder/decoder (CODEC) circuitry, application specific integrated circuitry (ASIC), microprocessor circuitry, microprocessor circuitry, or the like.

Referring back to the embodiment illustrated in FIG. 5, switching device 501 has a layout such that the integrated circuitry driving the trench capacitors 535 and 537 of optical switching device 534 is disposed in the semiconductor substrate layer 503 opposite and/or across optical confinement layer 557. As a result, transistors 569 and 577 are relatively close in distance to optical switching device 534. Thus, conductors 585 and 587 are shorter in length than they would be if the integrated circuitry driving trench capacitors 535 and 537 were disposed further away in for example the same semiconductor substrate layer 559. Since shorter length conductors 585 and 587 are be employed in accordance with the teachings of the present invention, reduced loads and/or capacitances are associated with conductors 585 and 587. Therefore, higher switching speeds of trench capacitors 535 and 537 of optical switching device 534 through conductors 585 and 587 are attainable in accordance with the teachings of the present invention. For instance, in one embodiment, nanosecond switching speeds or faster are realized with optical switch 501.

In one embodiment, optical switch 501 is also fabricated from a multi-layered SOI wafer including a semiconductor substrate layer 567, which is disposed proximate to an optical confinement layer 565, which is disposed proximate to semiconductor substrate layer 559, which is disposed proximate to optical confinement layer 557, which is disposed proximate to semiconductor substrate layer 503, which is disposed proximate to optical confinement layer 505. In one embodiment, all optical confinement layers 565, 557 and 505 include insulating layers. In one embodiment, optical confinement layers 565 and 557 confine optical beam 511 and switched optical beam 527 from exiting semiconductor substrate layer 559 until exiting through optical output port 551.

In one embodiment, during manufacture, a known SOI wafer is provided already including semiconductor substrate layer 567, optical confinement layer 565 and semiconductor substrate layer 559. Trench capacitors 535 and 537 of optical switching device are then formed in semiconductor substrate layer 559. It is noted that during fabrication of trench capacitors 535 and 537 in semiconductor substrate layer 559, high temperature processing, trenching and annealing may be performed. After trench capacitors 535 and 537 are fabricated, optical confinement layer 557 is formed with conductors 585 and 587 providing accesses to trench capacitors 535 and 537. Next, semiconductor substrate layer 503 is formed proximate to optical confinement layer 557. The integrated circuitry including for example transistors 569 and 577 are then formed in semiconductor substrate layer. In one embodiment, optical confinement layer 505 is then formed. Afterwards, ball bonds 507 and package substrate 509 are added.

In another embodiment, during manufacture, another known SOI wafer is provided already including semiconductor substrate layer 567, optical confinement layer 565, semiconductor substrate layer 559, optical confinement layer 557 and semiconductor substrate layer 503. In one embodiment, the SOI wafer is then trenched through semiconductor substrate layer 503 to semiconductor substrate layer 559 and then trench capacitors 535 and 537 of optical switching device 534 are then formed in semiconductor substrate layer 559. In one embodiment, high temperature processing, trenching and annealing may now be performed to form the trench capacitors 535 and 537 of optical switching device 534. Conductors 585 and 587 are formed to provide access to optical switching device 534. In one embodiment, the integrated circuitry including transistors 569 and 577 is then formed in semiconductor substrate layer 503 using known processing techniques. In one embodiment, optical confinement layer 505 is then formed and then ball bonds 507 and package substrate 509 are then added.

In one embodiment, the integrated circuitry including for example transistors 569 and 577 in semiconductor substrate layer 503 is metal oxide semiconductor (MOS) type circuitry. It is appreciated that in accordance with the teachings of the present invention, the high temperature processing, trenching, annealing procedures and the like are performed on the wafer of switching device 501 prior to the formation of the integrated circuitry of semiconductor substrate layer 503. Therefore, the integrated circuitry included in semiconductor substrate layer 503 is not exposed to the relatively stressful procedures that might be used to form trench capacitors 535 and 537 of optical switching device 534. Accordingly, relatively sensitive logic and circuitry, which might otherwise could not be formed on the same piece of silicon as trench capacitors can be formed on the same wafer as the trench capacitors 535 and 537 in accordance with the teachings of the present invention.

Figure 6:
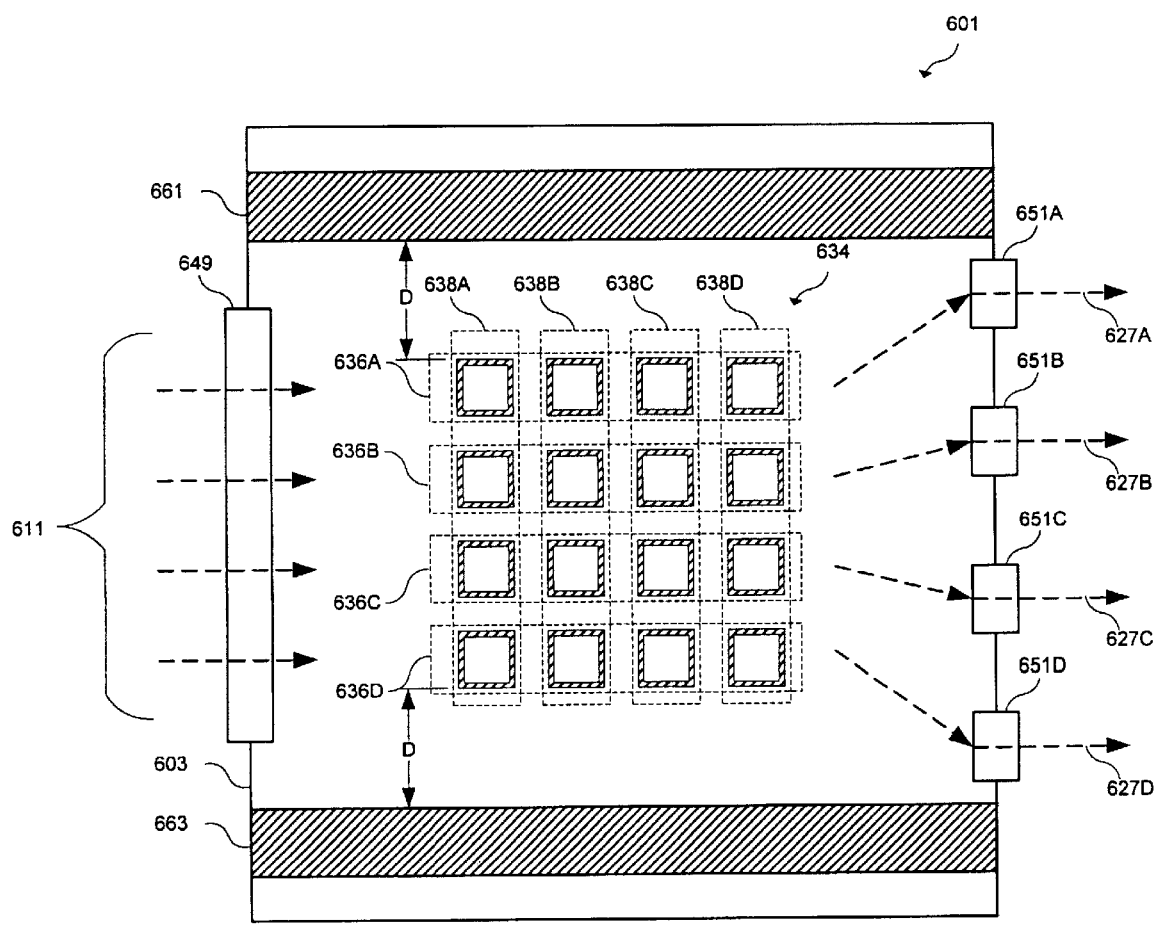
FIG. 6 is a top view illustration of one embodiment of optical confinement regions included in an optical switch including a phase array to selectively direct an incident optical beam to one of a plurality of output ports in accordance with the teachings of the present invention.

FIG. 6 is a top view illustration of yet another embodiment of an optical switch 601 including a optical switching device 634, which in one embodiment includes an optical switching device 634 having a phase array with a plurality of trench capacitors to selectively direct an optical beam 611 to one of a plurality of output ports in accordance with the teachings of the present invention. As illustrated, optical switch 601 includes an optical input port 649 optically coupled to one side of semiconductor substrate layer 603. Optical switch 601 also includes a plurality of optical output ports 651A, 651B, 651C and 651D optically coupled to the opposite side of semiconductor substrate layer 603. In one embodiment, optical fibers or the like are optically coupled to optical input port 649 and optical output ports 651A, 651B, 651C and 651D. Optical switching device 634 including an array of trench capacitors is disposed in the semiconductor substrate layer 603 between optical input port 649 and optical output ports 651A, 651B, 651C and 651D. In the depicted embodiment, optical beam 611 is directed from optical input port 649 through semiconductor substrate layer 603 to the optical switching device 634.

In one embodiment, optical switching device 634 includes is a two-dimensional phase array of trench capacitors including a plurality of rows 636A, 636B, 636C and 636D of trench capacitors and a plurality of columns 638A, 638B, 638C and 638D of trench capacitors. In another embodiment, optical switching device 634 includes a one-dimensional phase array of trench capacitors including a plurality of rows 636A, 636B, 636C and 636D. In one embodiment, each row 636A, 636B, 636C and 636D are coupled to receive one of a plurality signals to bias each individual row 636A, 636B, 636C and 636D of the optical switching device 634. In another embodiment, each trench capacitor in a two dimensional phase array of optical switching device 634 is separately coupled to receive one of a plurality signals of a signal to bias optical switching device 634.

In one embodiment, optical confinement regions 661 and 663 are disposed along the optical path between optical input port 649 and the optical output ports 651A, 651B, 651C and 651D. As shown in the embodiment depicted in FIG. 6, optical confinement regions 661 and 663 are disposed a distance D away from insulating regions of the trench capacitors of optical switching device 634. In one embodiment, D is a distance greater than or equal to zero. In one embodiment, optical confinement layers, similar to for example the optical confinement layers discussed in connection with optical switches 101, 401 or 501 in FIGS. 1, 4 and 5 above are also disposed along the "tops" and "bottoms" of the optical path is disposed between optical input port 649 and optical output port 651. These optical confinement layers are not shown in FIG. 6 for clarity.

In one embodiment, the integrated circuitry used to generate the plurality signals to bias each individual row 636A, 636B, 636C and 636D of optical switching device 634 is generated with integrated circuitry disposed on the same wafer as optical switch 601. In one embodiment, this integrated circuitry is disposed in a different semiconductor substrate layer across an optical confinement layer, as described for example in connection with optical switch 501 of FIG. 5.

Operation of one embodiment of the phase array optical switching device 634 is as follows. In one embodiment, semiconductor substrate layer 603 is doped to include free charge carriers. In one embodiment, at least each row 636A, 636B, 636C and 636D of optical switching device 634 is separately biased by the signal to control a charge distribution across optical switching device 634. For instance, assume in one example that semiconductor substrate layer 603 is n type doped silicon and that the free charge carriers are therefore electrons. Assume further that the trench capacitors in row 636A are coupled to receive for example +3 volts from the signal, the trench capacitors in row 636B are coupled to receive +2 volts, the trench capacitors in row 636C are coupled to receive +1 volt and that the trench capacitors in row 636D are coupled to receive +0.5 volts. It is appreciated that these voltages are provided for explanation purposes only and that other voltages can be applied as appropriate. Since each trench capacitor is coupled to a positive voltage in this example, each trench capacitor will attract electrons in semiconductor substrate layer 603. In addition, the trench capacitors that are coupled to receive a higher voltage of the signal will attract more electrons. As a result, the charge density of the free charge carriers will be proportional to the voltage applied to the particular trench capacitor. Thus, in one embodiment, there is a gradient in the charge distribution of free charge carriers across optical switching device 634, which is controlled by the signal.

Continuing with the example discussed above with reference to FIG. 6, assume now that optical beam 611 is directed from optical input port 649 through semiconductor substrate layer 603 to optical switching device 634. A portion of optical beam 611 will pass through the trench capacitors of row 636A. A portion of optical beam 611 will pass through the semiconductor substrate layer 603 between rows 636A and 636B. A portion of optical beam 611 will pass through the trench capacitors of row 636B. A portion of optical beam 611 will pass through the semiconductor substrate layer 603 between rows 636B and 636C. A portion of optical beam 611 will pass through the trench capacitors of row 636C. A portion of optical beam 611 will pass through the semiconductor substrate layer 603 between rows 636C and 636D. Finally, a portion of optical beam 611 will pass through the trench capacitors of row 636D.

The portions of optical beam 611 passing through rows 636A, 636B, 636C and 636D of optical switching device 634 will experience a modulation of phase since these portions of optical beam 611 pass through the densely charged regions, similar to that illustrated in the example of FIG. 2. In one embodiment, at least some portions of optical beam 611 that are phase modulated are phase shifted by approximately $2\pi$. The portion of optical beam 611 passing through row 636A will experience more phase modulation than the portion of optical beam 611 passing through row 636D since the free charge carrier density is greater in row 636A than in row 636D due to the higher applied voltage. The portions of optical beam 611 passing between the rows will experience relatively no phase modulation, since there are substantially no free charge carriers in these portions of optical switching device 634. A resulting diffraction interference occurs between the phase modulated portions and non-phase modulated portions of optical beam 611. The interference among the different portions of the optical beam results in an interference intensity pattern caused by optical switching device 634, which may be controlled by the signal as applied to the trench capacitors of optical switching device 634.

In another embodiment, additional optical confinement regions (not shown) are disposed between each row 636A, 636B, 636C and 636D of optical switching device 634. In this embodiment, there are no portions of optical beam 611 passing between rows 636A, 636B, 636C and 636D. Accordingly, in this embodiment, the interference among different portions of optical beam 611 are the result of different portions of optical beam 611 passing through different rows 636A, 636B, 636C and 636D. For instance, the portion of optical beam 611 passing through row 636A interferes with the portions of optical beam 611 passing through the other rows 636B, 636C and 636D of optical switching device 634.

As can be appreciated to those skilled in the art, the interference intensity pattern includes a plurality of maximas that are directed away from optical switching device 634 at an angle θ relative to the incident optical beam. In one embodiment of the present invention, the interference intensity pattern of the phase array optical switching device 634 can be controlled by a signal controlling the distribution of charge across optical switching device 634. As a result, the angular locations θ of the maximas of the interference intensity pattern caused by optical switching device can be controlled by the signal applied to the trench capacitors of optical switching device 634. Thus, the signal applied to optical switching device 634 can be used to selectively direct optical beam 611 to either optical output port 651A, 651B, 651C or 651D. In one embodiment, each optical output port 651A, 651B, 651C or 651D represents a different output channel of optical switch 601.

In one embodiment, the number, length and spacing of trench capacitors in the phase array of optical switching device 634 are determined by the number of output channels of optical switch 601. By applying the appropriate bias voltages to the trench capacitors of optical switching device 634 to control the gradient of the charge distribution across optical switching device 634, the resulting interference of the outgoing optical beam 627A, 627B, 627C or 627D is directed or steered to the optical output port 651A, 651B, 651C or 651D of interest. That is, by appropriately controlling the gradient of the charge distribution across optical switching device 634, the maximas of interference intensity pattern caused by optical switching device 634 can be shifted to illuminate the selected optical output port 651A, 651B, 651C or 651D.

Figure 7:
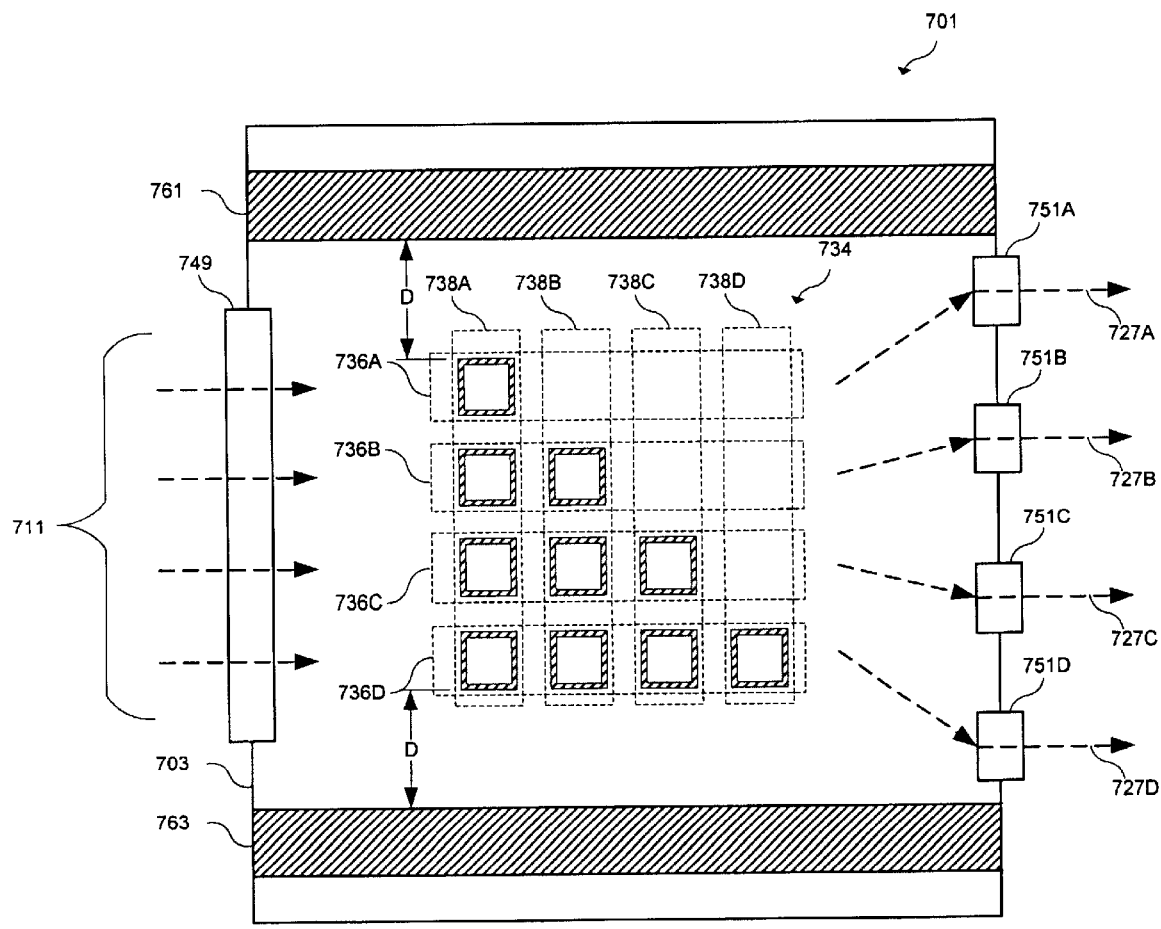
FIG. 7 is a top view illustration of another embodiment of optical confinement regions included in an optical switch including a phase array having an asymmetric geometry to selectively direct an incident optical beam to one of a plurality of output ports in accordance with the teachings of the present invention.

It is appreciated that the embodiment of the phase array of optical switching device 634 illustrated in FIG. 6 has a symmetric geometry of rows and columns. It is appreciated that in other embodiments, the phase array of optical switching device 634 is not limited to having a symmetric geometry. For instance, FIG. 7 is an illustration of another embodiment of an optical switch 701 including an optical switch 734 having a phase array with a plurality of trench capacitors arranged in an asymmetric geometry in accordance with the teachings of the present invention.

As illustrated, optical switch 701 includes an optical input port 749 optically coupled to one side of semiconductor substrate layer 703. Optical switch 701 also includes a plurality of optical output ports 751A, 751B, 751C and 751D optically coupled to a different side of semiconductor substrate layer 703. In one embodiment, optical fibers or the like are optically coupled to optical input port 749 and optical output ports 751A, 751B, 751C and 751D. Optical switching device 734 including an array of trench capacitors is disposed in the semiconductor substrate layer 703 between optical input port 749 and optical output ports 751A, 751B, 751C and 751D. In the depicted embodiment, optical beam 711 is directed from optical input port 749 through semiconductor substrate layer 703 to the optical switching device 734.

In one embodiment, optical switching device 734 includes a phase array have a two-dimensional array of trench capacitors including a plurality of rows 736A, 736B, 736C and 736D of trench capacitors and a plurality of columns 738A, 738B, 738C and 738D of trench capacitors. In another embodiment, optical switching device 734 includes a phase array having a one-dimensional array of trench capacitors including a plurality of rows 736A, 736B, 736C and 736D. In one embodiment, each row 736A, 736B, 736C and 736D are coupled to receive one of a plurality signals to bias each individual row 736A, 736B, 736C and 736D of optical switching device 734. In another embodiment, each trench capacitor in a two dimensional phase array of optical switching device 734 is separately coupled to receive one of a plurality signals of a signal to bias optical switching device 734. In one embodiment, the plurality signals to bias each individual row 736A, 736B, 736C and 736D of optical switching device 734 are generated by integrated circuitry disposed in another semiconductor substrate layer across an optical confinement layer, similar to what is shown in FIG. 5.

In one embodiment, optical confinement regions 761 and 763 are disposed in semiconductor substrate layer 703 along the sides of the optical path between optical input port 749 and optical output ports 751A, 751B, 751C and 751D. As shown in the embodiment depicted in FIG. 7, optical confinement regions 761 and 763 are disposed a distance D away from insulating regions of the trench capacitors of optical switching device. 734. In one embodiment, D is a distance greater than or equal to zero.

As illustrated in FIG. 7, each row 736A, 736B, 736C and 736D of the phase array of optical switching device 734 is not limited to having the same number of capacitors. Similarly, each column 736A, 736B, 736C and 736D of optical switching device 734 is not limited to having the same number of capacitors. In operation, each row and/or column of the phase array of optical switching device 734 in one embodiment may be coupled to receive fixed voltages or the same voltages to modulate the charge distribution of free charge carriers across optical switching device 734. Since the geometry of the arrangement of capacitors in optical switching device 734 has been varied to be asymmetric, there is a gradient in the charge distribution of free charge carriers across optical switching device 734, even though a fixed voltage or the same voltage is applied to each row 736A, 736B, 736C and 736D and/or column 736A, 736B, 736C and 736D of optical switching device 734. In another embodiment, a combination of fixed voltages and different voltages are utilized in accordance with the teachings of the present invention.

In operation, the portions of optical beam 711 passing through rows 736A, 736B, 736C and 736D of the phase array of optical switching device 734 will experience a modulation of phase since these portions of optical beam 711 pass through the densely charged regions, similar to that illustrated in the example of FIG. 2. The portion of optical beam 711 passing through row 736A will experience less phase modulation than the portion of optical beam 711 passing through row 736D since the free charge carrier density is greater in row 736D than in row 736A since there are more charged capacitors, and therefore more free charge carriers, in row 736D. The portions of optical beam 711 passing between the rows will experience relatively no phase modulation, since there are substantially no free charge carriers in these portions of optical switching device 734. A resulting diffraction interference occurs between the phase modulated portions and non-phase modulated portions of optical beam 711. The interference among the different portions of the optical beam results in an interference intensity pattern caused by optical switching device 734, which may be controlled by the signal as applied to the trench capacitors of optical switching device 734.

In another embodiment, additional optical confinement regions (not shown) are disposed between each row 736A, 736B, 736C and 736D of optical switching device 734. In this embodiment, there are no portions of optical beam 711 passing between rows 736A, 736B, 736C and 736D.

Accordingly, in this embodiment, the interference among different portions of optical beam 711 are the result of different portions of optical beam 711 passing through different rows 736A, 736B, 736C and 736D. For instance, the portion of optical beam 711 passing through row 736A interferes with the portions of optical beam 711 passing through the other rows 736B, 736C and 736D of optical switching device 734.

Thus, by applying the appropriate bias voltages to the trench capacitors of a phase array of optical switching device 734 having an appropriate geometry to control the gradient of the charge distribution across optical switching device 734, the resulting interference of the outgoing optical beam 727A, 727B, 727C or 727D is directed or steered to the optical output port 751A, 751B, 751C or 751D of interest.

In yet another embodiment, some or all of the individual capacitors within a particular row and/or column are selectively charged by the signal to control the gradient in the charge distribution of free charge carriers across the phase array. In this embodiment, a fixed voltage or the same voltage could be applied by the signal to charge some selected particular rows and/or columns of capacitors to control charge distribution across the phase array. Thus, the phase array is charged asymmetrically by the signal to control or steer the incident optical beam to the selected optical output port. In this embodiment, the phase array could have a symmetric or asymmetric arrangement of rows and columns, and the rows and/or columns of capacitors in the phase array would be symmetrically or asymmetrically charged by the signal.

In one embodiment, a plurality of phase arrays, such as for example those described in FIG. 6 and/or 7, are disposed on the same semiconductor substrate layer to provide an M×N channel optical switch or router. In another embodiment, a multi-wavelength optical beam is separated into a plurality of single-wavelength optical beams. Each of these single-wavelength optical beams may then be directed to a corresponding phase array to be selectively directed to any one of a plurality of output ports of an optical switch in one embodiment of the present invention.

Throughout this specification, it is noted that the optical switching devices 134, 234, 334, 434A, 434B, 534, 634 and 734 of the optical switches of FIGS. 1–7 have been illustrated using trench capacitors for discussion purposes. Trench capacitors in accordance with the teachings of the present invention produce an index of refraction change in the semiconductor substrate layers in which the trench capacitors are disposed. As discussed, the changes in index of refraction produce phase shifts of optical beams. In some embodiments, the effects of the phase shifts of the optical beams produce optical beam steering such that optical beams may be selectively directed to optical output ports in accordance with the teachings of the present invention. It is appreciated that in other embodiments, other types of optical switching devices may be employed in accordance with the teachings of the present invention. Other known types of optical switching devices that may be employed include for example thermal heaters, current injectors, P-N junctions, or the like.

As is known, thermal heating of the semiconductor substrate layer in the optical beam can be employed to change the index of refraction to phase shift an optical beam. In one embodiment of the present invention, known thermal heating is accomplished in an optical switching device by depositing thermal heaters on the surface of a semiconductor substrate layer in the form of polysilicon resistors or implanting diffusion based resistors and passing current through these resistors. In another embodiment, known current injectors are employed in an optical switching device for current injection to inject charge carriers into the phase shift region of in the semiconductor substrate layer. In yet another embodiment, current injection is accomplished by an optical switching device by using known forward biased diodes or P-N junctions disposed in the semiconductor substrate layer. In still another embodiment, known reverse biased P-N junctions are employed by an optical switching device, which when biased cause a depletion region to be formed in the semiconductor substrate layer. The formed depletion region causes an index change by sweeping out charge carriers in the depletion region of the semiconductor substrate layer.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
   a semiconductor substrate layer;
   an optical switching device, comprising an array of capacitors, disposed in the semiconductor substrate layer,
   first and second optical ports disposed in the semiconductor substrate layer, the first and second optical ports optically coupled to the optical switching device;
   a first optical confinement layer disposed proximate to the semiconductor substrate layer; and
   a second optical confinement layer disposed proximate to the semiconductor substrate layer, the semiconductor substrate layer disposed between the first and second optical confinement layers.

2. The apparatus of claim 1 wherein the first and second optical confinement layers comprise insulative material.

3. The apparatus of claim 1 further comprising an optical path disposed in the semiconductor substrate layer between the first and second optical ports, the optical switching device disposed within the optical path.

4. The apparatus of claim 3 further comprising first and second optical confinement regions disposed in the semiconductor substrate along the optical path, the first optical confinement region disposed opposite the second optical confinement region across the optical path, the first and second optical confinement layers and the first and second optical confinement regions to confine an optical beam passing through the optical path to remain within the optical path.

5. The apparatus of claim 1 further comprising a silicon on insulator (SOI) semiconductor wafer.

6. The apparatus of claim 1 further comprising a signal line coupled to the optical switching device, the signal line routed through the first optical confinement layer, the signal received by the optical switching device through the signal line.

7. The apparatus of claim 1, further comprising a charge region proximate to the array, the charge region modulated responsive to a signal coupled to be received by the array.

8. The apparatus of claim 7 wherein the signal comprises a plurality of individual signals, each one of the plurality of individual signals coupled to one of the capacitors of the array.

9. The apparatus of claim 7 wherein the signal is coupled to control a charge distribution across the array, an interference intensity pattern of the array to be controlled in response to the charge distribution.

10. The apparatus of claim 1 wherein the optical switching device comprises a thermal heater disposed in the semiconductor substrate layer.

11. The apparatus of claim 10 wherein the thermal heater comprises a resistor disposed in the semiconductor substrate layer.

12. The apparatus of claim 1 wherein each one of the capacitors comprise:

a polysilicon region disposed in the semiconductor substrate layer; and an insulator disposed between the polysilicon region and the semiconductor substrate layer.

13. The apparatus of claim 1 wherein the optical switching device comprises a P-N junction disposed in the semiconductor substrate layer.

14. The apparatus of claim 1 wherein the optical switching device comprises a current injector disposed in the semiconductor substrate layer.

15. A method, comprising:

directing an optical beam through a first optical port into a semiconductor substrate layer;

directing the optical beam along the semiconductor substrate layer through an optical switching device comprising a phase array of capacitors disposed in the semiconductor substrate layer;

selectively directing the optical beam to a second optical port in response to a signal coupled to be received by the optical switching device;

confining the optical beam from exiting a first side of the semiconductor substrate layer with a first optical confinement layer disposed proximate to the first side semiconductor substrate layer; and confining the optical beam from exiting a second side of the semiconductor substrate layer with a second optical confinement layer disposed proximate to the second side semiconductor substrate layer, the first side opposite the second side of the semiconductor substrate layer.

16. The method of claim 15 further comprising modulating an interference intensity pattern of the phase array in response to the signal.

17. The method of claim 15 wherein directing the optical beam along the semiconductor substrate layer comprises directing the optical beam through an optical path disposed between the first optical port and the second optical port through the semiconductor substrate.

18. The method of claim 17 further comprising:

confining the optical beam from exiting a first side of the optical path with a first optical confinement region disposed in the semiconductor substrate layer proximate to the first side of the optical path; and confining the optical beam from exiting a second side of the optical path with a second optical confinement region disposed in the semiconductor substrate layer proximate to the second side of the optical path.

19. The method of claim 15 further comprising selectively directing the optical beam to a third optical port in response to the signal coupled to be received by the optical switching device.

20. The method of claim 15 further comprising modulating a charge distribution across the phase array in response to the signal.

21. An apparatus, comprising:

means for receiving an optical beam in a semiconductor substrate layer;

means for directing the optical beam through the semiconductor substrate layer to an optical switching device comprising an array of capacitors disposed in the semiconductor substrate layer;

means for selectively directing the optical beam to a means for transmitting the optical beam from the semiconductor substrate layer in response to a signal; and means for confining the optical beam from exiting the semiconductor substrate layer between the means for receiving the optical beam and the means for transmitting the optical beam.

22. The apparatus of claim 21 wherein the means for confining the optical beam from exiting the semiconductor substrate layer between the means for receiving the optical beam and the means for transmitting the optical beam comprises:

a first insulative means disposed proximate to a first side of the semiconductor substrate layer; and a second insulative means disposed proximate to a second side of the semiconductor substrate layer, the semiconductor substrate layer disposed between the first and second insulative means.

23. The apparatus of claim 21 wherein the means for transmitting the optical beam from the semiconductor substrate layer comprises a plurality of optical ports, wherein one of the plurality of optical ports is selected in response to the signal.

24. The apparatus of claim 21 further comprising means for modulating a charge distribution across the phase array in response to the signal.

* * * * *